(12) United States Patent
Hunter et al.

(10) Patent No.: US 7,601,932 B2
(45) Date of Patent: Oct. 13, 2009

(54) OVEN

(76) Inventors: Joseph Richard Andrew Hunter, 19A Burley Down, Chandlers Ford, Eastleigh SO53 4NR (GB); Andrew Dennis Kulka, 54 Dovers Green Road, Reigate RH2 8BT (GB)

( * ) Notice: Subject to any disclaimer, the term of this patent is extended or adjusted under 35 U.S.C. 154(b) by 360 days.

(21) Appl. No.: 10/570,773

(22) PCT Filed: Sep. 3, 2004

(86) PCT No.: PCT/GB2004/003787

§ 371 (c)(1),
(2), (4) Date: May 2, 2006

(87) PCT Pub. No.: WO2005/024308

PCT Pub. Date: Mar. 17, 2005

(65) Prior Publication Data

US 2007/0039488 A1 Feb. 22, 2007

(30) Foreign Application Priority Data

Sep. 3, 2003 (GB) ................................ 0320607.5

(51) Int. Cl.
*A21B 1/26* (2006.01)
(52) U.S. Cl. .................. 219/400; 126/21 A; 99/474
(58) Field of Classification Search .................. None
See application file for complete search history.

(56) References Cited

U.S. PATENT DOCUMENTS

| 4,308,853 | A | * | 1/1982 | Thirode ................ 126/21 A |
| 4,409,453 | A | | 10/1983 | Smith |
| RE31,765 | E | * | 12/1984 | Guibert ................ 219/400 |
| 5,039,841 | A | * | 8/1991 | Kato et al. ............ 219/388 |
| 5,185,172 | A | | 2/1993 | Barkhau et al. |
| 5,539,187 | A | | 7/1996 | Smith et al. |
| 5,826,496 | A | | 10/1998 | Jara |
| 6,218,650 | B1 | | 4/2001 | Tsukamoto et al. |
| 6,615,819 | B1 | * | 9/2003 | Hernandez Burgos et al. .............. 126/21 A |
| 6,689,991 | B2 | * | 2/2004 | Kim et al. ............ 219/400 |
| 6,933,473 | B2 | * | 8/2005 | Henke et al. ......... 219/400 |
| 7,060,940 | B2 | * | 6/2006 | Kim et al. ............ 219/400 |
| 2001/0004069 | A1 | * | 6/2001 | Kim et al. ............ 219/400 |
| 2003/0024925 | A1 | * | 2/2003 | Graves et al. ........ 219/681 |
| 2004/0129692 | A1 | * | 7/2004 | Kim et al. ............ 219/400 |

FOREIGN PATENT DOCUMENTS

EP 0 872 203 A1 10/1998

* cited by examiner

*Primary Examiner*—Joseph M Pelham
(74) *Attorney, Agent, or Firm*—Wegman, Hessler & Vanderburg

(57) ABSTRACT

A dual-mode oven (40) which is capable of being used in a rotisserie mode or in a convection mode, the oven comprising heater means (8) and fan means (7), the heater means and the fan means being located at the top of the oven cavity (43), in use, the fan means forces air across the heater means and into the cooking space through adjustable heated air outlets (46). In a rotisserie mode the heated air outlets are inwardly directed towards food to be cooked, and in a convection mode the heated air outlets are outwardly directed so as to distribute heated air evenly throughout the cooking space.

8 Claims, 12 Drawing Sheets

Figure 1:
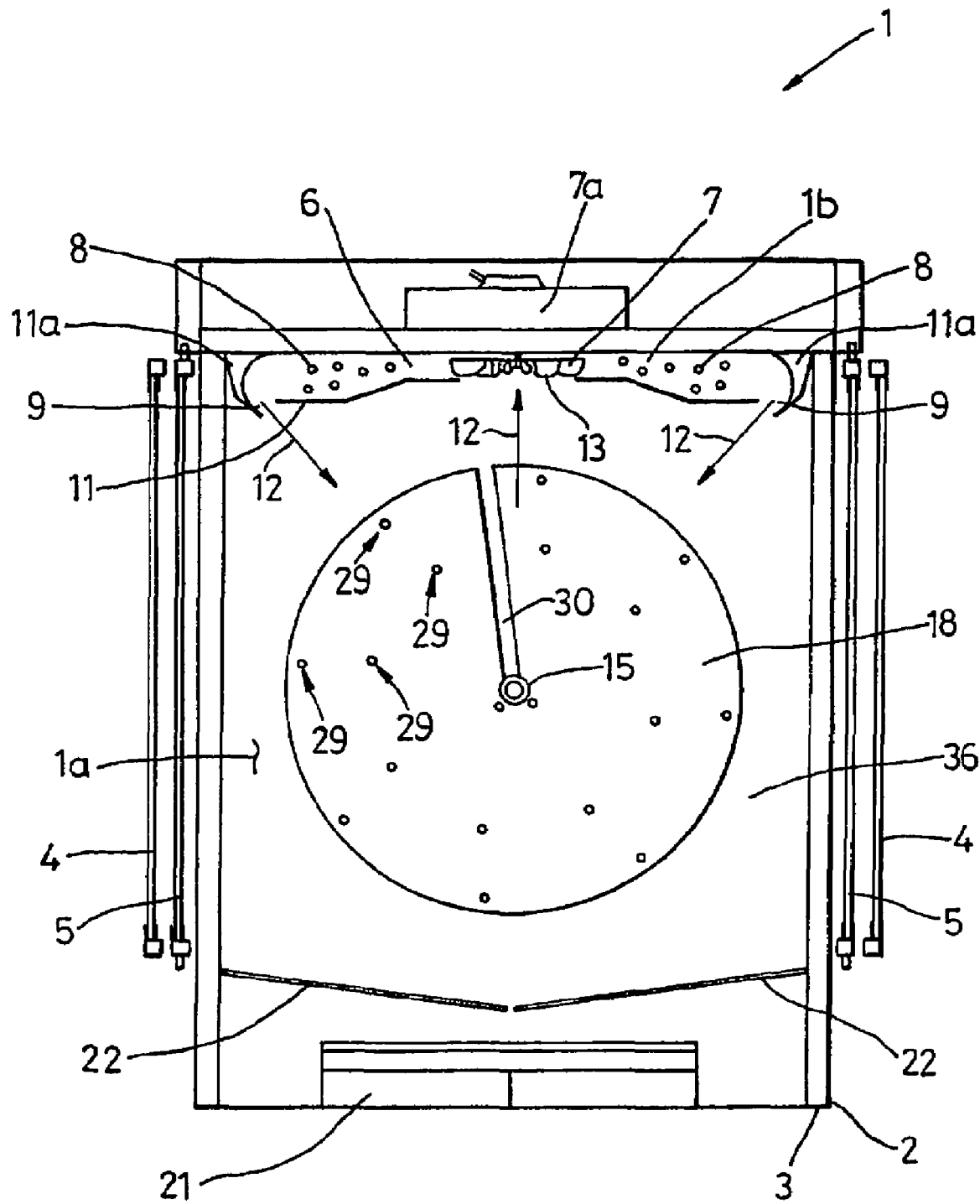

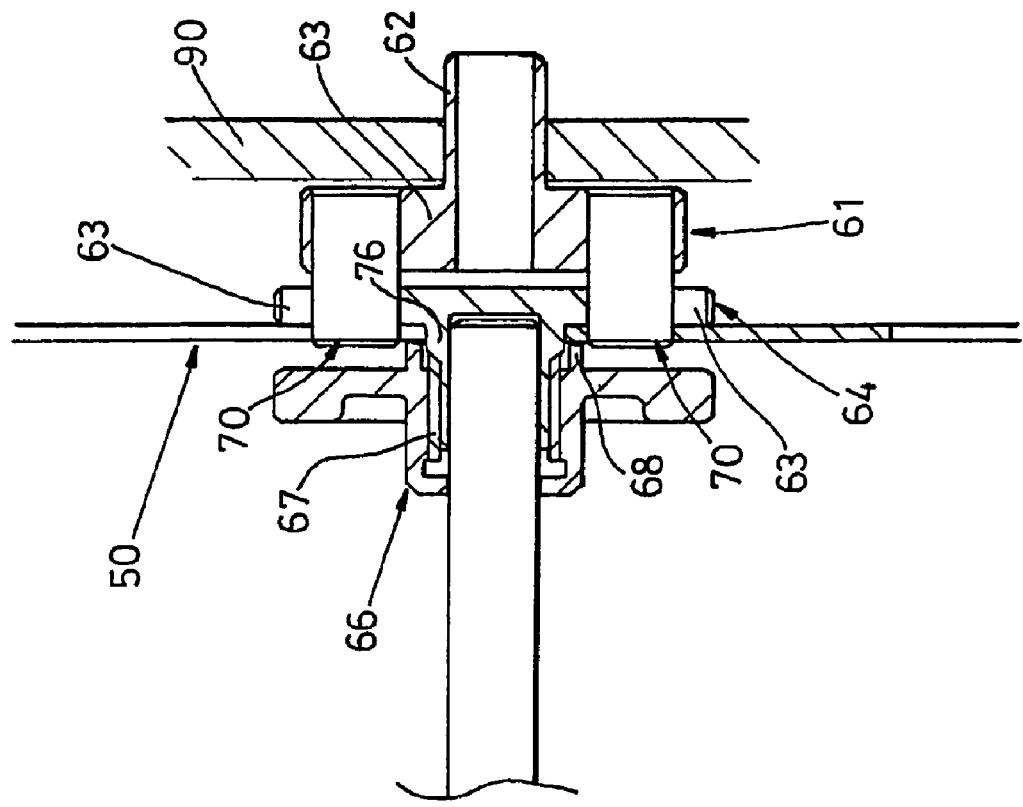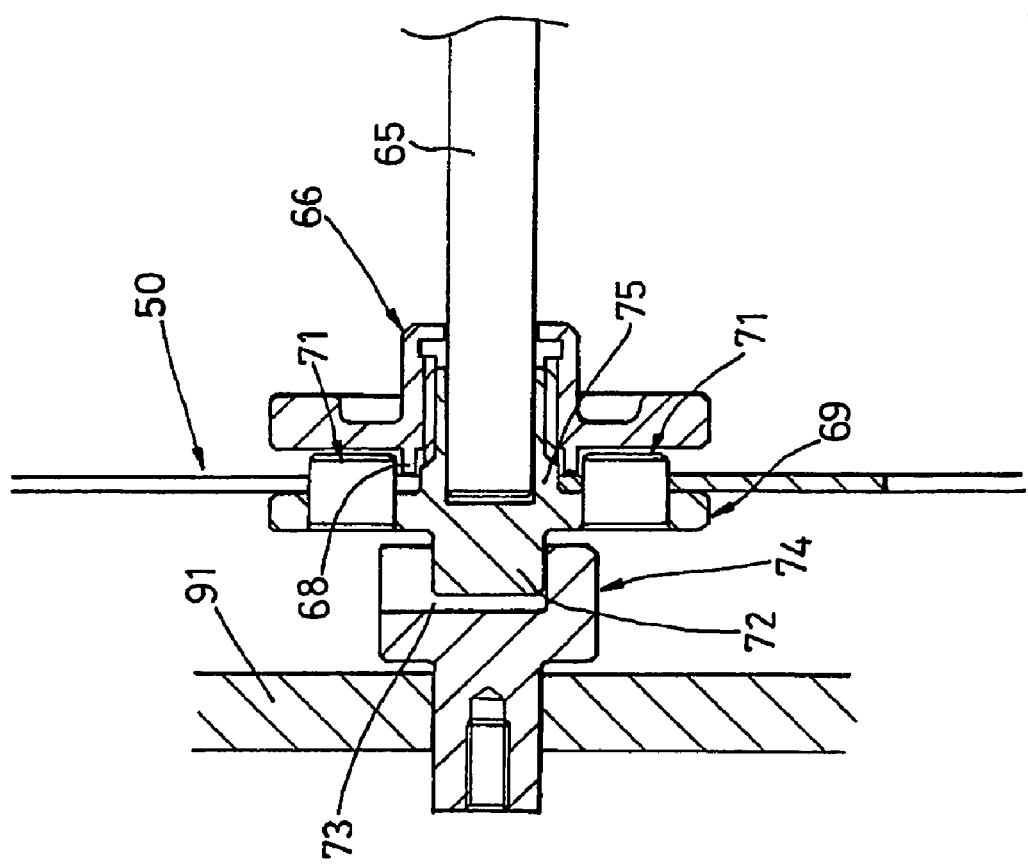
Fig. 7

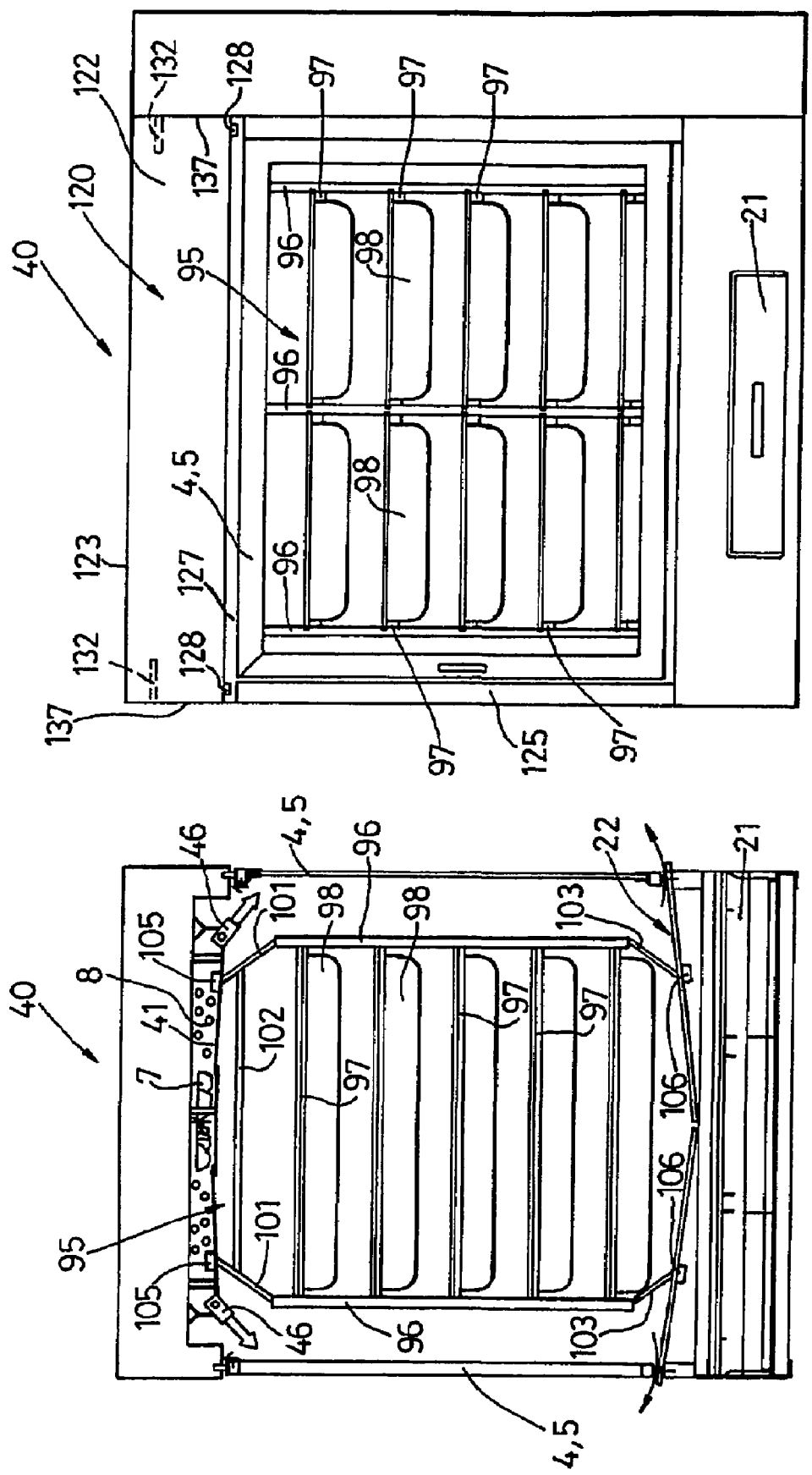

OVEN

CROSS REFERENCE TO RELATED APPLICATIONS

This application claims the priority filing benefit of International PCT application PCT/GB2004/003787 filed Sep. 3, 2004, and published under PCT 21(2) in the English language; and Great Britain Patent Application Serial No. 0320607.5 filed Sep. 3, 2003.

The present invention relates to ovens, and in particular to ovens for cooking food.

Ovens for cooking food traditionally comprise a closed cavity in which the items to be cooked are placed and heated air is directed into the space within the cavity. The air is typically heated by way of a gas or solid fuel burner or by electric resistance radiators. Such ovens have proven to provide a satisfactory cooked result and these designs continue to be widely used throughout the domestic and commercial food preparation equipment manufacturers markets.

One problem with many known ovens is that to cook the food inside the air temperature in the oven cavity must be raised sufficiently to impart heat to the food item being cooked by means of thermal conduction and radiation. This creates an internal oven temperature that quickly raises the temperature of the oven walls, spits, racks and trays within the oven space and allows fat or meat juices to stick onto them and become burned and carbonised, necessitating a periodical costly cleaning process to ensure that this deposit is not allowed to build up on these surfaces where they could impart a burnt taint to further cooked food, or be the fuel of a flash fire.

During the cooking process the food items lose moisture and therefore weight, due to evaporation caused by the heating process. This moisture loss is undesirable as the food items can become dry, will be smaller in size and weigh less after they have been cooked.

The requirement to cook differing food items in supermarkets, convenience stores or hotels and restaurant locations can result in each location having a variety of oven types, rotisserie oven, convection oven or combination oven. This can result in expensive equipment costs, long periods of disuse or capacity and throughput restrictions due to the non-flexible nature of each oven design. The present oven seeks to provide an improved oven.

According to a first aspect of the invention there is provided an oven comprising fan means and heater means, the fan means and the heater means being located towards a roof of the oven, the heater means comprising first heater means and second heater means and the fan means being provided between the first and second heater means, the fan means being adapted, in use, to convey air across the heater means and towards heated air outlet means.

According to a second aspect of the invention there is provided an oven comprising fan means and heater means, the fan means and the heater means being provided towards a roof of the oven, the oven being capable of operating in a grill mode in which at least one blade of heated air is directed towards foodstuffs in the cooking space, and in a convection mode in which heated air is substantially evenly distributed in the cooking space.

In a grill mode one or more blades of heated air may be directed towards food rotated on a spit assembly or the like, (which may in that situation be termed a rotisserie mode), or directed towards food on a stationary support, such as a tray.

According to a third aspect of the invention there is provided a spit supporting assembly for a rotisserie oven, the assembly comprising two spit supporting members which are adapted to be mounted on rotation means and the assembly, in use, carrying a plurality of spits extending between the spit support means, each spit support member being provided with a plurality of sets location means adapted to receive respective spits, spit location means comprising a radially inner first spit location means, and radially outer second and third spit location means, the second and third spit location means being angularly offset from each other, and the first, second and third spit location means being accessible from both sides of each spit support member.

Spits are generally elongate members in the form of pins, rods or skewers and are adapted to carry food to be cooked. In some instances spits may be used to support elongate baskets or trays which carry food to be cooked.

According to a fourth aspect of the invention there is provided an oven comprising heater means, fan means and atomiser means, the atomiser means being adapted to atomise the liquid into a mist, the atomiser means being located such that, in use, the mist is issued into the oven cavity.

According to a fifth aspect of the invention there is provided an oven comprising fan means and heater means, the fan means and the heater means being located towards a roof of the oven, in use, the fan means conveys air across the heater means and towards heated air outlet means, the heated air outlet means directing heated air into the cooking space, the oven further comprising maintenance access means comprising a moveable housing portion which is located in a frontal region or a rearward region of the oven, the arrangement of the oven being such that, in use, the moveable housing portion is adapted to be moved away from an access port and allow access to the fan means.

According to a sixth aspect of the invention there is provided an oven capable of cooking food in a rotisserie mode in which, in use, food to be cooked is rotated in the oven cavity by way of a rotisserie spit assembly, the oven comprising illumination means which, in use, is operative to illuminate food rotating on the rotisserie spit assembly, the illumination means being located towards a frontal region of the oven of the upper region of the oven the illumination means being of generally elongate construction and extending in a direction which is substantially parallel to the width of the oven, the oven further comprising a window through which light from the illumination means can pass, the window at least in part separating the oven cavity from the illumination means.

In one embodiment of the invention there is provided an apparatus for a cooking oven in which food items can be cooked quickly to reduce the loss of juices and weight during the cooking process and reduce substantially the burning or charring of the surface of the food items or the inside surfaces of the oven that features, the oven comprising removable rotary spits, baskets or trays for rotisserie oven use, and removable shelving or racking for convection oven use, atomiser means for the introduction of moisture to provide controllable humidity or steam that can be used with the rotisserie or convection oven uses. The oven further comprises one or more heating elements and one or more fan assemblies, the fan assemblies being driven by a motor outside of the cooking space, to provide air flow around the heating elements, in use the heated air flow is contained within the cooking space and re-circulates through the fan, over the heat source and back to the cooking space, the fan assemblies and heat source are so situated within an air duct channel to ensure that all of the air flow from the fan is forced across the heated surfaces of the heat source thus the air becomes increasingly heated by the method of heat conduction and in rotisserie use arrangement the heated air is forced out of the air duct channel through vents directly towards the food items to be cooked, and, in convection use the heated air is forced through the removable ducting plates that may be used to support the trays or pans where the hot air is transferred through the cooking space by an arrangement of ducting in the panels.

To reduce the amount of moisture loss from the food items during cooking, the atomiser means for the introduction of atomised water droplets in the form of mist into the heated airflow is sited at the top of the oven space. The water flow into the atomiser means can be controlled to maintain the optimum humidity or steam levels within the cooking space and also to ensure that excess water is not allowed to build-up necessarily within the cooking space, which would then require the provision of a drainage system to dispense with the surplus levels.

In a rotisserie oven mode food items are placed onto rotary spits, baskets or trays arranged within the oven cavity, and are caused to rotate. The rotisserie spits, carrying the meats to be cooked, rotate past the hot air outlet, through the heated airflow, which applies, heated air directly onto and around the meats to be cooked. The application of concentrating the heated airflow directly onto and around the foodstuff to be cooked and the orientation of the foodstuffs ensures that a greater proportion of the heat generated is conducted into the food items providing a shorter cooking period and also ensures that a smaller proportion of the heat generated is conducted into the oven walls, spits, baskets, racks and trays within the oven space, therefore reducing the burning of fats, food juices and cooking residue onto these surfaces and thus the amount of time required to clean these internal surfaces is greatly reduced.

In a convection oven mode the hot air is preferably directed through the ducting in the panels, which allows for an even temperature throughout the cooking space. Provision may be made to enable units to be joined together, above, below or to the side, as required, to provide greater capacity or flexibility of use.

Figure 2:
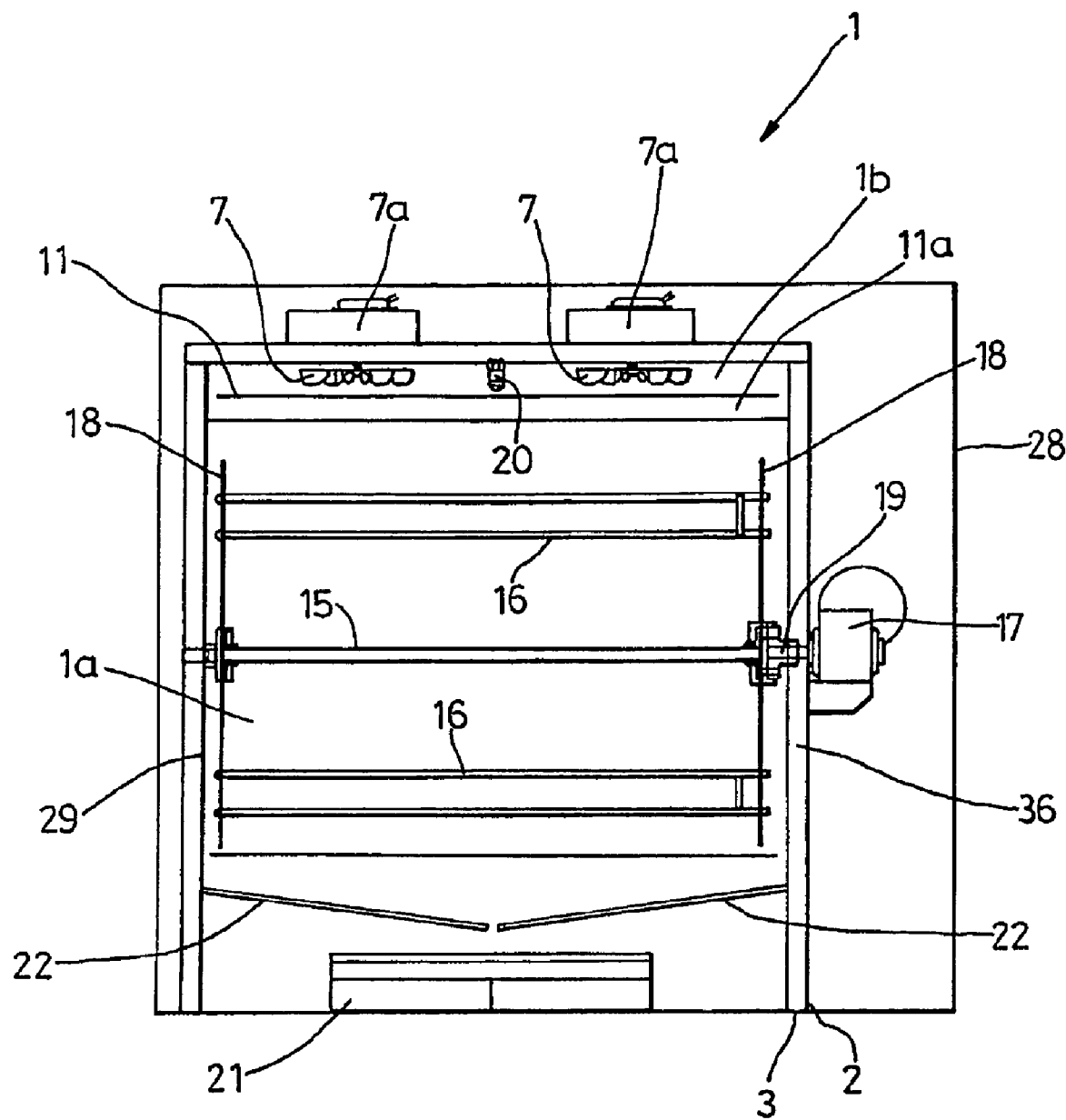
Figure 3:
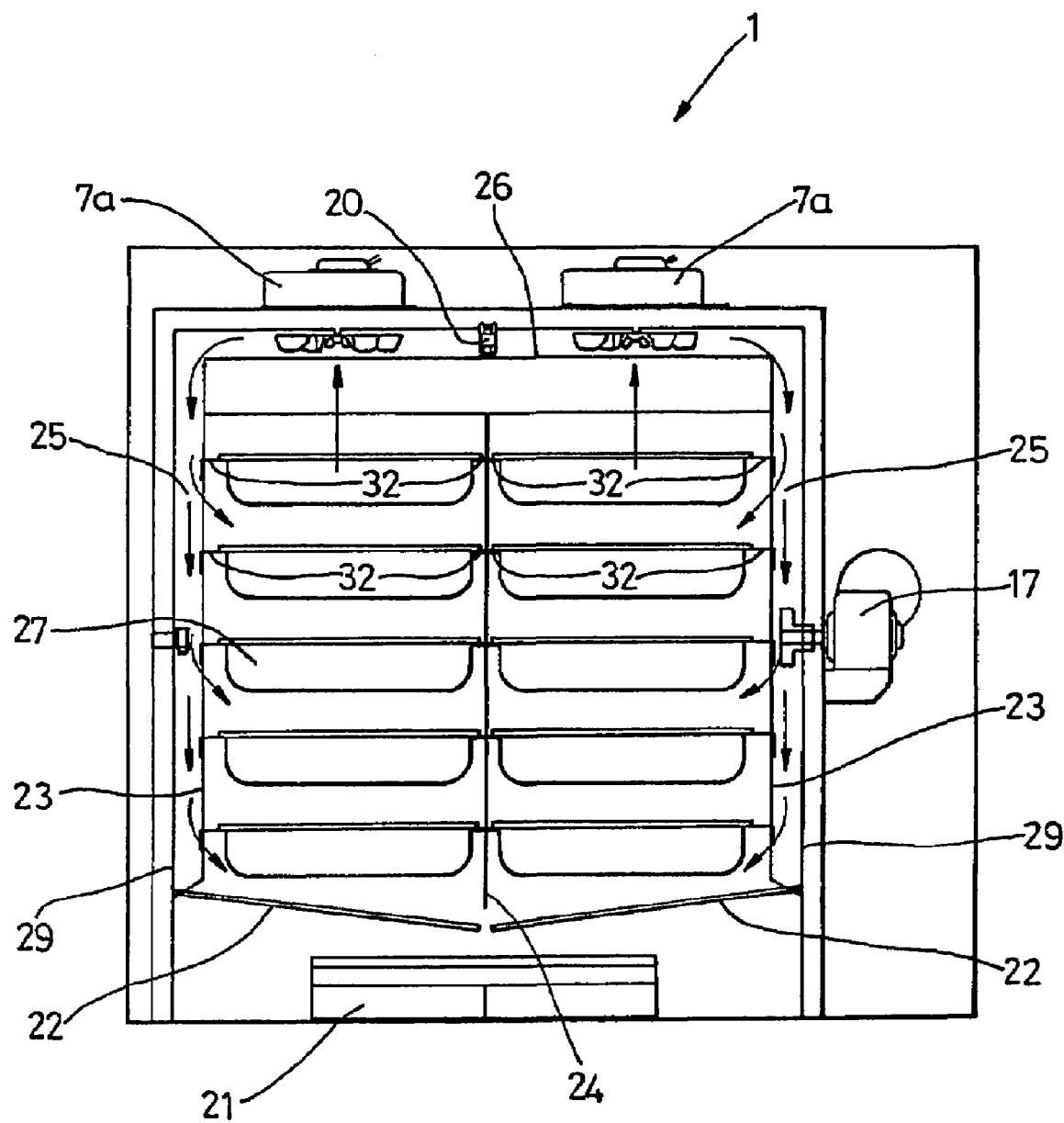
Figure 4:
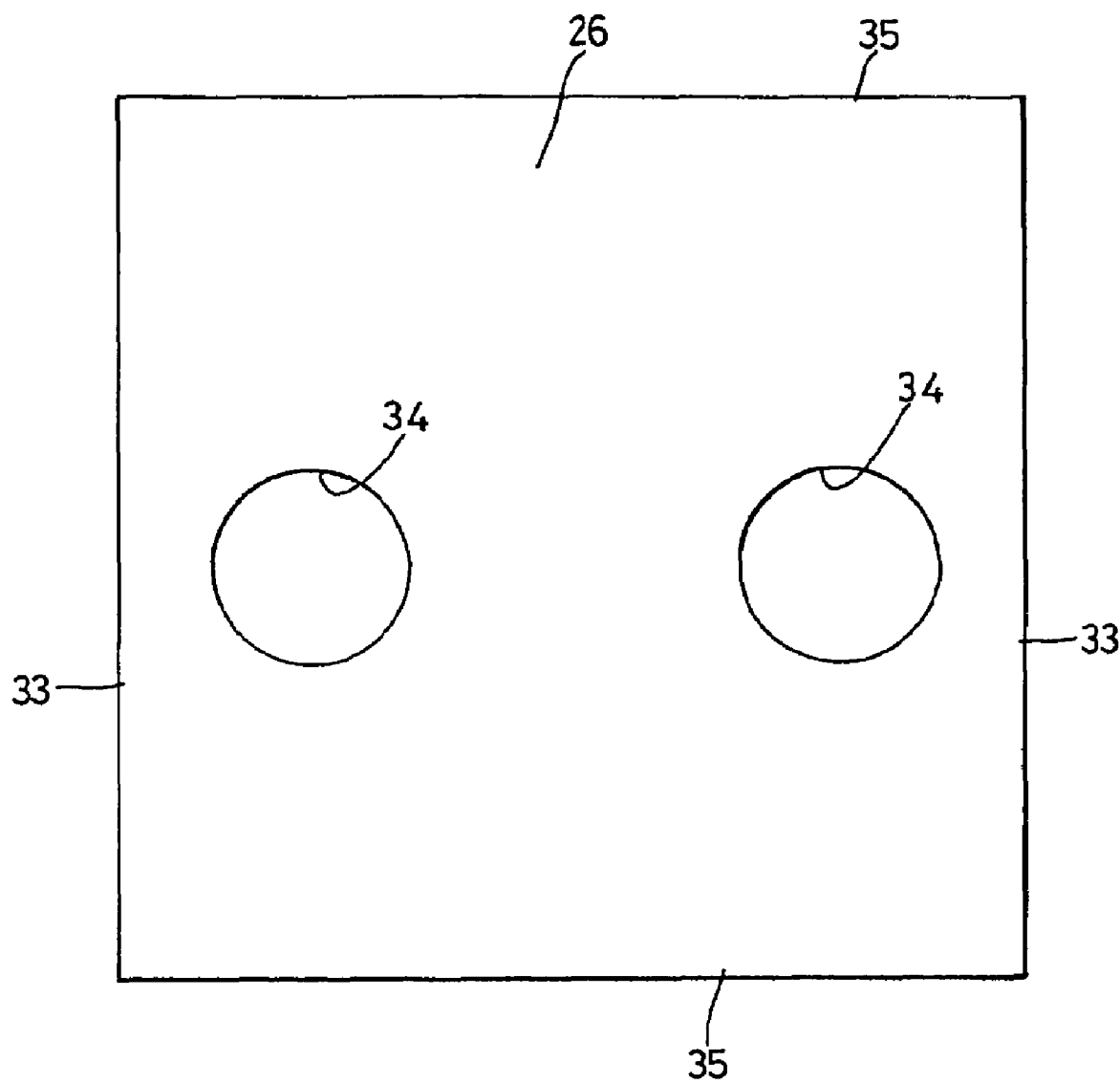
Figure 5:
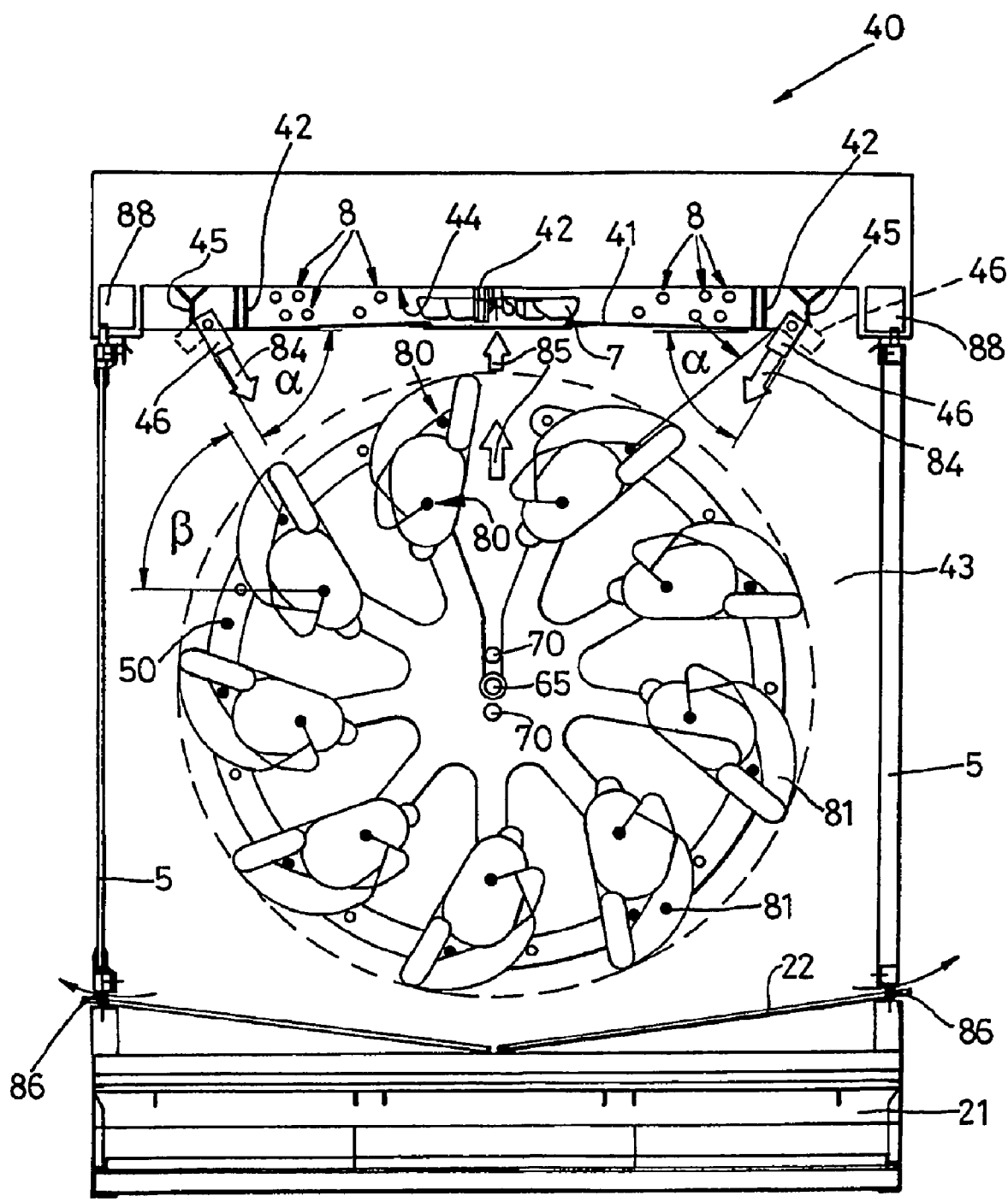
Figure 6:
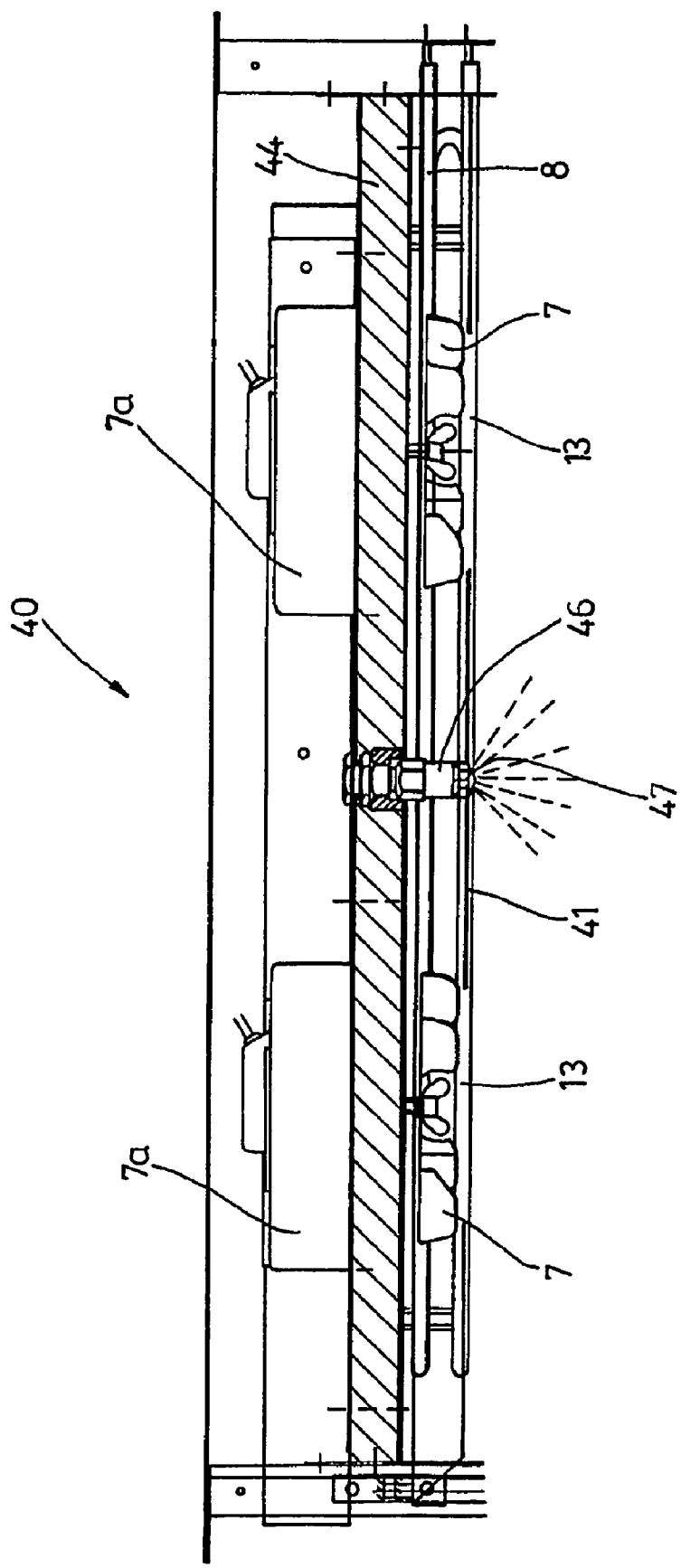
Figure 8:
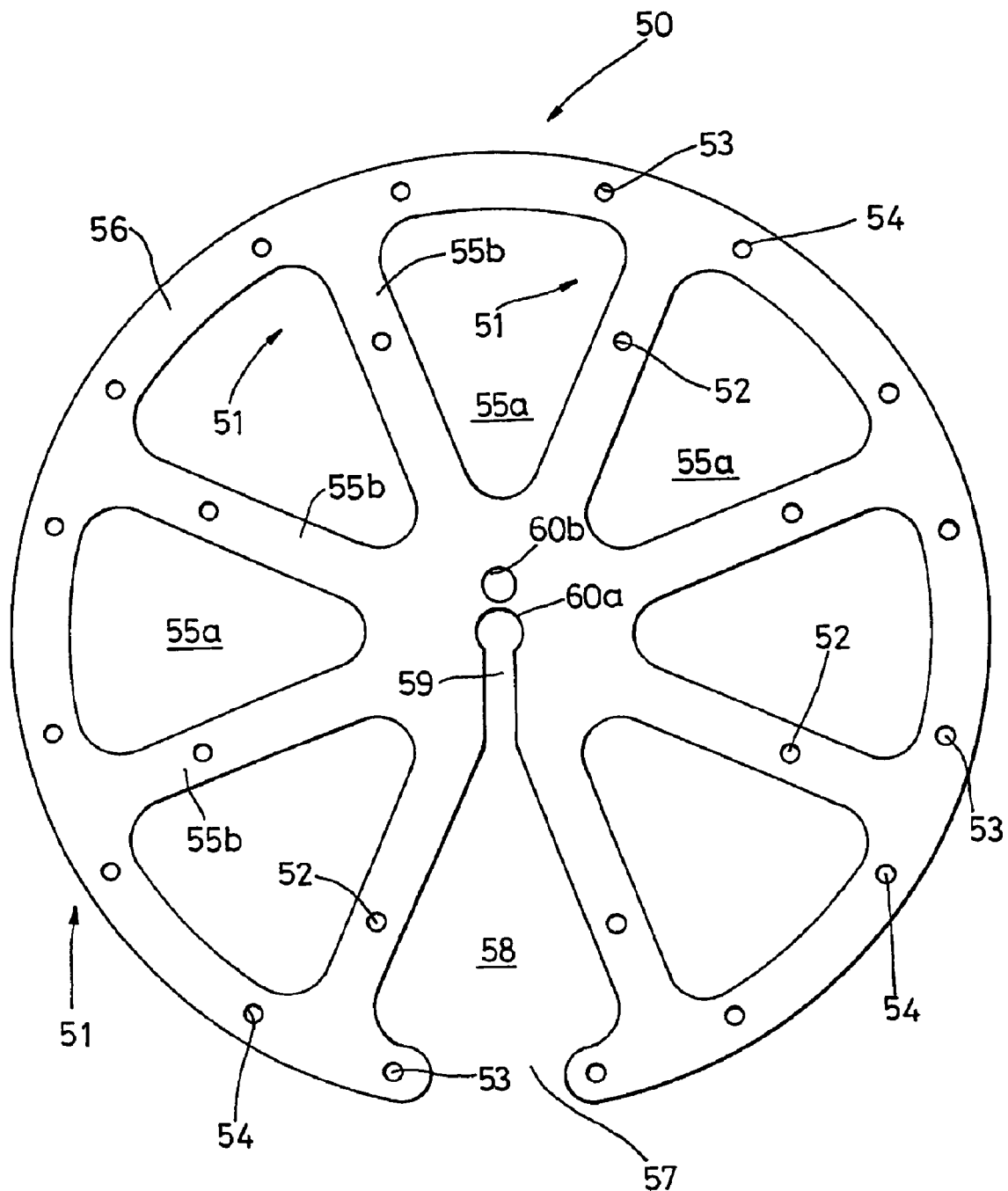
Figure 9:
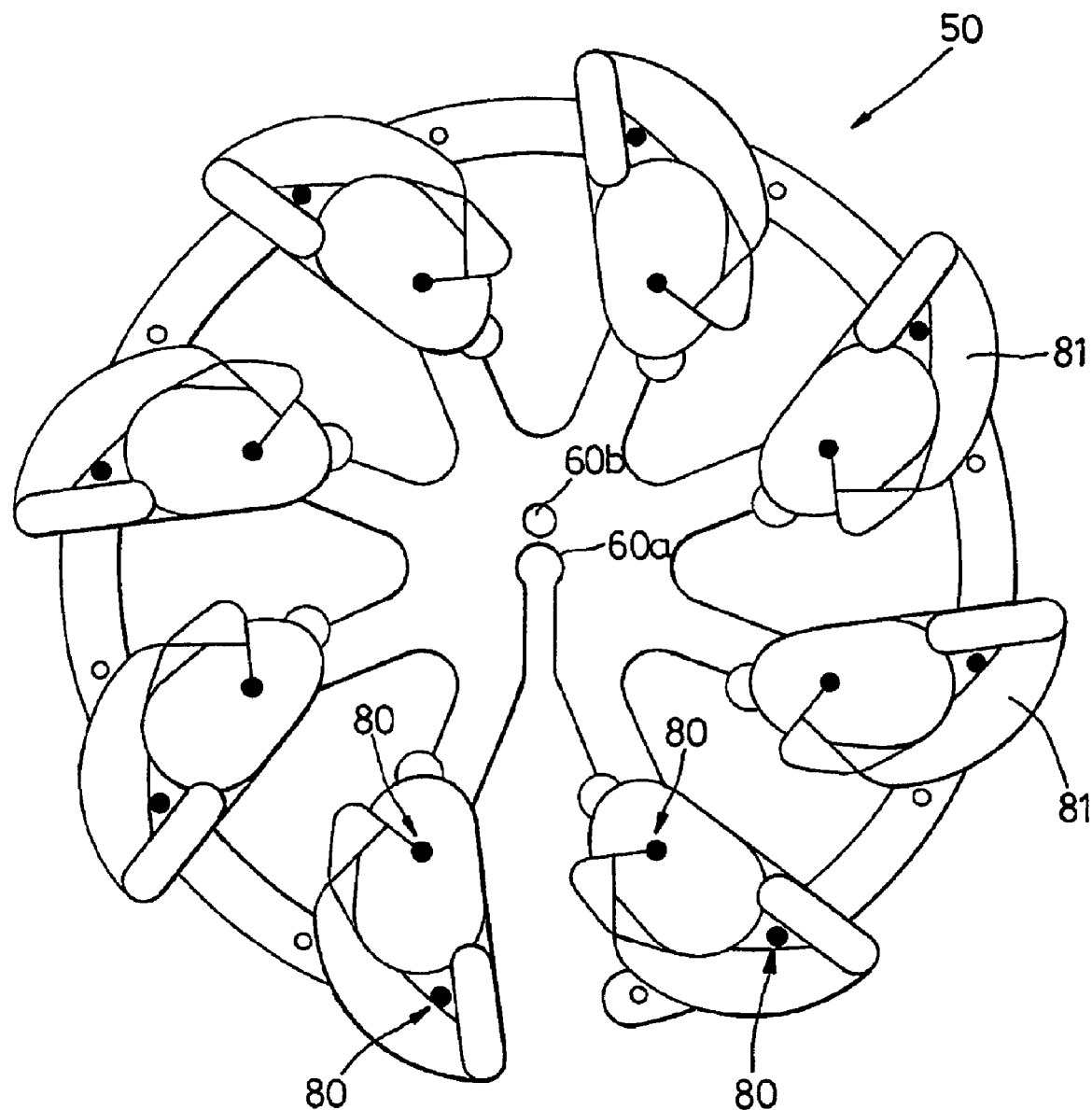
Figure 12:
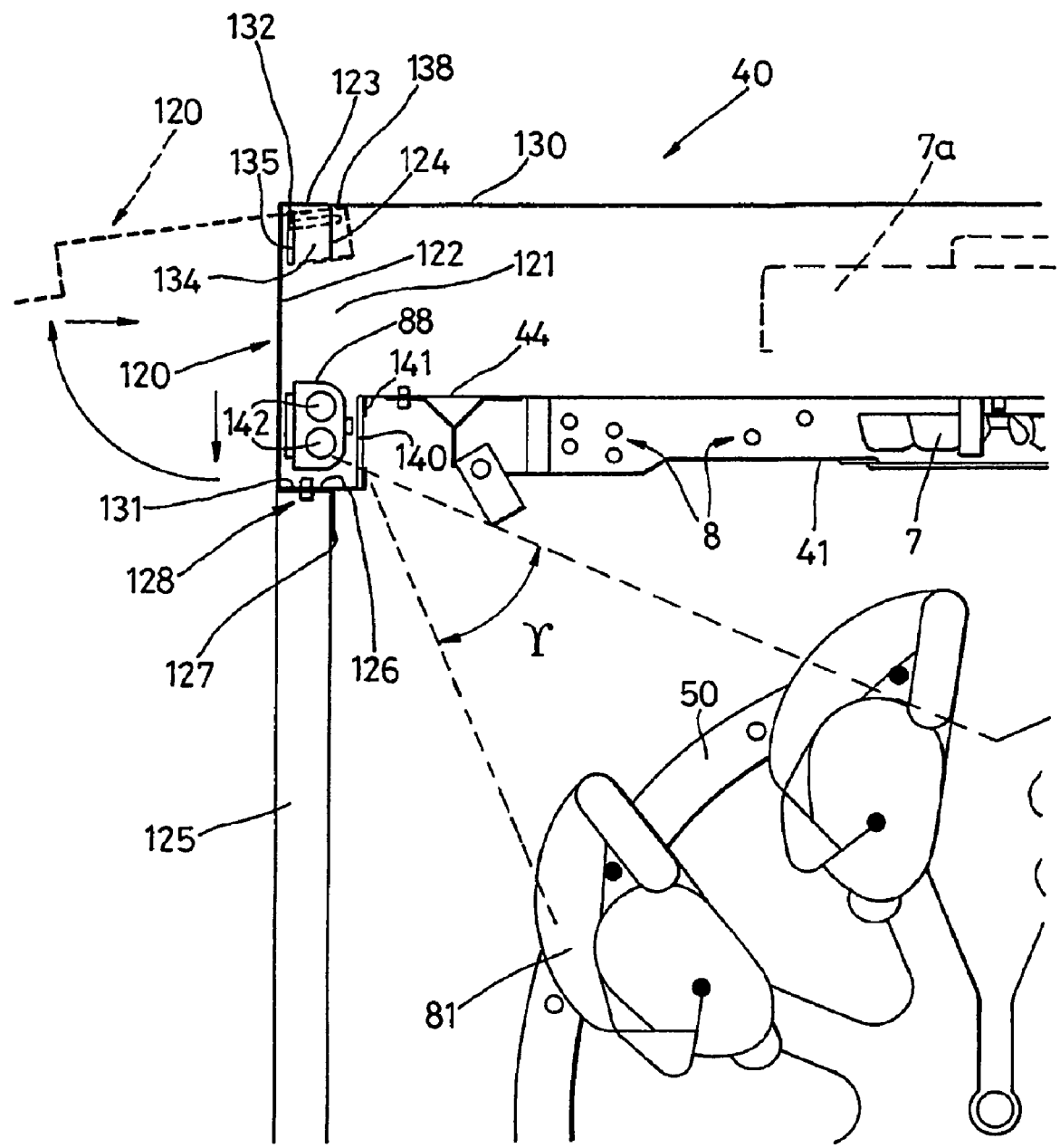
Figure 13:
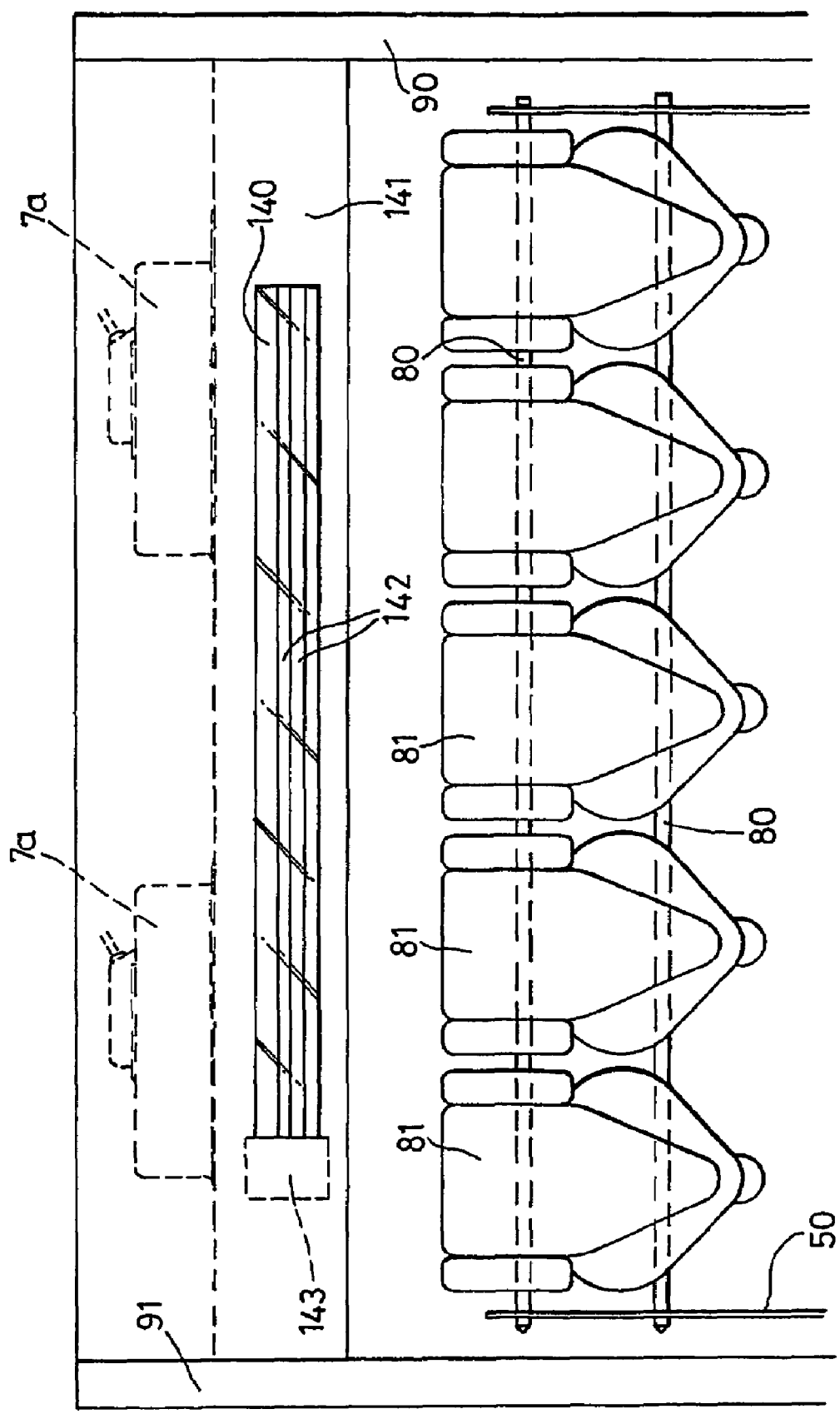

Various embodiments of the invention will now be described by way of example only, with reference to the accompanying drawings in which:

FIG. 1 shows a schematic cross-sectional side elevation of an oven configured for use as a rotisserie oven, FIG. 2 shows a cross-sectional front elevation of the oven of FIG. 1, FIG. 3 shows a schematic cross-sectional front elevation of the oven of FIGS. 1 and 2 configured for use as a convection oven, FIG. 4 is a plan view of a convection ducting plate of the oven in FIG. 3, FIG. 5 is a schematic cross-sectional side elevation of a second embodiment, FIG. 6 is an enlarged view of the heating and misting assemblies of the oven in FIG. 5, FIG. 7 is an enlarged view of the rotisserie assembly of the oven of FIGS. 5 and 6, FIG. 8 is a plan view of a rotisserie disc of the oven of FIGS. 5, 6 and 7, FIG. 9 is a plan view of a rotisserie disc loaded with chickens in a different orientation, FIG. 10 is a schematic cross-sectional side view of the view of FIG. 5 in convection oven mode, FIG. 11 is a front elevation of the view of FIG. 10, FIG. 12 is an enlarged view of FIG. 5, and, FIG. 13 is a schematic view looking from inside the oven of FIG. 5 towards a door opening.

As shown in FIG. 1, an oven 1 is provided with an oven cavity comprising a cooking space 1a contained within an outer casing 2 with insulation 3 therebetween. The front and rear of the cooking space is accessed by doors comprising two heat resistant glass panels 4 and 5 to ensure relatively low temperatures on the outer surfaces (for safety reasons)

The oven 1 in a rotisserie mode will first be described. An air duct 6 defines a heater space 1b in the oven cavity and is positioned above the cooking space 1a. The air duct 6 houses two air circulation fans 7 and heating elements 8, the fans driven by respective motors 7a. The air duct 6 is formed to provide the two outlet vents 9 in combination with shaped end wall structures 11a that are configured to deliver the heated air directly to the food items to be cooked as they rotate past. The air duct 6 is covered by a panel 11 which may be removable for the periodical cleaning of the fan blades 7 and heating elements 8. The airflows as shown generally by the arrows 12 are in the form of inwardly directed blades of heated air to form concentrated regions of heat, the concentrated or localised regions of heat being located in an upper region of the cooking space 1a. The blades may be viewed as concentrated streams of heated air. Once directed into the cooking space 1a air is then drawn upwards into the fans 7 through apertures 13 in the removable panel 11, through the duct 6, over the heating elements 8, out through the angled outlet vents 9, onto and around the food items to be cooked and back to the fans 7. The air temperature is controlled to a pre-determined level by means of a temperature sensor (not shown) mounted within the airflow pattern. The sensor produces a signal that controls the power to the heating elements 8 and therefore controlling the air temperature within the oven space 1a.

As shown in FIG. 2, the cooking space 1a has provisioned within it, a horizontal rotatable shaft 15 with a removable rotisserie arrangement of spits 16 (only some of which are shown for ease of illustration) and two support discs 18. An electrically powered drive motor 17 is located between the cooking space 1a and an outer enclosure 28. A connection assembly 19 is rotatably linked to the motor 17 extends into the cooking space 1a to drive the horizontal rotatably mounted shaft 15, and accordingly the two support discs 18 and the rotisserie arrangement of spits 16. The two opposed discs 18 are provided towards opposed side walls 29 of the oven. Each disc 18 is provided with a radially extending aperture 30 and a plurality of through-holes 29. The apertures 30 enable the discs 18 to be loaded on the rotatably mounted shaft 15. The through-holes 29 are dimensioned to receive the spits 16. Towards the base of the oven 1 is located a tray 21 to collect any residue that falls onto angled plates 22 that cover the collection tray 21. The air flow 12 re-circulating around the cooking space 1a flows over the angled plate 22 to ensure that any residue is pasteurised during the cooking process, but is not sufficiently heated to be burnt and carbonised necessitating a periodical costly cleaning process.

An atomiser 20 is located at the top of the oven cavity in the heater space 1b to allow the introduction of water in a fine mist spray into the airflow, either prior to, or during the cooking cycle. The atomiser 20 is controllable to maintain a high humidity or required steam levels within the cooking space 1a.

As shown in FIG. 3, the oven can be quickly converted from a rotisserie oven to a convection oven by the removal of the rotisserie arrangement of spits 16, the horizontal shaft 15, the two support discs 18, the panel 11 and the shaped end wall structures 11a. Two side support plates 23, a central support plate 24 and the fan cover 26 are then attached to preformed connections provided in the side walls 36 of the oven 1. The support plates 23 and 24 have provided laterally thereof transverse rails 32. Onto the rails 32 can be placed the flanged rims of the pans or trays 27 for the placing of foodstuffs ie fish, meats, breads, pastries and the like to be cooked.

In the convection mode air is forced around the heating elements 8 over the side edges 33 of the fan cover 26 and generally downwardly towards the base of the cooking space 1a. It will be appreciated that since the fan cover 26 is dimensioned to be of somewhat lesser area than the cross-sectional area of the cooking space 1a, heated air will inevitably also be forced over front and rear edges 35. By virtue of apertures 34 provided in the fan cover 26 (as best seen in FIG. 4) and located beneath a respective fan, heated air is then drawn generally inwards and then upwards towards the fans to be re-circulated. In a convection mode the speed of the airflow into the cooking space is generally increased (as compared to that required for the grilling effect in a rotisserie mode) so as to ensure substantially even distribution of heated air in the cooking space. This is preferably achieved by increasing the speed of the fans.

FIG. 5 shows an oven 40 very similar to that shown in FIGS. 1 to 3, and like reference numerals denote like or essentially like features. Like the oven 1, the oven 40 is adapted to be used in either a rotisserie mode where food is effectively grilled by blades of heated air, or in a convection mode where heated air is substantially evenly distributed throughout the cooking space 43 of the oven.

The roof 44 of the oven 40 is provided with ducting 41 (very similar to the ducting 11 of FIG. 1) which is attached to the roof 44 by way of a plurality of suspension legs 42. The heater space defined between the ducting 41 and the roof 44 is provided with two fan assemblies 7 which are disposed between heating elements 8. Sides of the aforementioned space are defined by side walls 45 which are also affixed to the roof 44.

Pivotable heated air outlets 46, of generally elongate form and extending generally parallel to the side walls 45, are provided in the space between the lowermost margins of the side walls 45 and side margins of the ducting 41. Each heated air outlet is of generally oblong-rectangular cross-section.

As best seen in FIG. 6 the roof 44 of the oven is provided with an atomiser 46 which comprises an outlet 47, the atomiser being located between the fans 7 and the heaters 8. The atomiser 46 is connected to a supply of water (not illustrated) and to atomiser metering means (not illustrated). The atomiser metering means comprises a solenoid valve which is controlled by a timer, the timer being operative to activate the atomiser for a required period or periods. What may be termed a pulsing effect is achieved in the latter case.

Two discs 50 are mounted in the oven cavity towards opposite sides thereof. Each disc is provided with a plurality of sets 51 of through-holes 52, 53 and 54. Each disc is of generally circular outline and is provided with a plurality of cutouts 55a which define radial limbs 55b and part-circular rim 56. The cut-outs reduce the weight of the discs and so facilitate handling thereof.

Through-holes 52 are disposed in limbs 55 radially inwardly of angularly spaced through-holes 53 and 54 which are provided in the rim 56.

Each disc 50 is provided with an opening 57 which leads radially inwards to a tapered aperture 58, which in turn leads to a substantially radial aperture 59 and then to (central) rotational shaft receiving aperture 60a. Each disc 50 further comprises a circular aperture 60b dimensioned for receiving one of a pair of connecting pins 70 or 71.

FIG. 7 shows how the discs 50 are mounted in the oven cavity. A shaft drive dog 61 is connected to a motor (not illustrated) by way of shaft portion 62 which passes through side wall 90. The drive dog 61 further comprises a base of cylindrical shape which is provided with two diametrically opposed connecting pins 70. The pins 70 are first received in respective apertures 63 of a driven end fixing 64 which is fixedly secured to the shaft 65. The pins 70 are then received by respective apertures in the disc 50, namely one pin 70 is received by aperture 60b and the other pin being received in aperture 59. Hub 76 of driven end fixing is received in central aperture 60a of the disc 50. A locking wheel 66 is attached onto the driven end fixing 64 by way of a threaded connection 67. The locking wheels 66 urge the disc 50 against the driven end fixing 64 by way of an annular formation 68.

Turning to the other side of the rotisserie assembly shown in FIG. 7, the shaft 65 is fixedly attached to a bearing end fixing 69 which is of similar construction to the driven fixing 64, however the former is provided with a shaft portion 72 which is receive in a substantially U-shaped channel 73 of a shaft bearing 74 mounted on side wall 91. Pins 72 of the bearing end fixing 69 are received in apertures 70 and 59 of the respective disc 50 with hub 75 being received in the central aperture 60a of said disc. Annular formation 68 locks the respective disc 50 in place against the bearing end fixing 69.

In order to be able to provide maintenance access to the fan motors 7a and the fluorescent tubes 88 access panels 120 are provided on the front and back of the oven 40, towards the top of the oven and generally above the door openings. Generally the front of the oven is that end which is viewable by customers. In the case of a pass-through oven the back, or rearward end, may be used to load the oven with food to be cooked. Each panel covers a respective opening 121 which is defined by external roof panel 130 and oven cavity roof panel 44. Each access panel 120 comprises a fascia 122, an upper portion 123, a first downwardly depending portion 124, a lower portion 126 and a second downwardly depending portion 127. Each panel is secured in position by way of removable fixings 128 which pass through respective apertures in an oven housing portion 131 located above each door opening and in lower portion 126 of the access panel.

End portions 134 of the access panel 120 are provided with elongate apertures 135 which receive inwardly directed pins 132 attached to a side wall 137 of the oven housing.

Should either of the lamps 88 or either of the fan motors 7a need to be serviced then a operator needs simply to release the appropriate fixings 128, (and as shown by the solid head arrows) allow the panel to drop downwards, pivot the panel outwardly and then push the panel inwardly and under lip 138 of the external panel 130 (as shown in broken line). Access is then available to replace a lamp or to replace a fan motor for example. Importantly the access panel 120 allows an operator easy access to a lamp and/or a fan motor even when a second oven (not shown) is stacked on top of the oven in question. In alternative embodiments the access panel may be wholly removable, or may be moveable clear of the opening 121 by way of translational movement only. It may be that an access panel is provided only at one of the front or back regions of an oven.

The operation of the oven 40 in the rotisserie mode will now be described. Chickens 81 are loaded onto spits 80, a row of adjacent chickens being loaded onto each pair of spits. The spits 80 are located in apertures 52 and 54. As best seen in FIG. 5 the heated air is directed into the oven cavity by the heated air outlets 46 as inwardly directed blades of heated air 84 towards the chickens 81 as they rotate. Air is then drawn upwards and into fans 7 to be re-circulated as shown generally by arrows 85. Venting gaps 86 are provided below the lowermost margins of the doors 4, 5 so that steam exiting therethrough can pass upwardly between inner and outer glass door panels 4 and 5. Alternatively side walls of the oven may be provided with ducting to channel steam therethrough.

Water seals are provided around the sides and the top of each door to ensure retention of moisture in the cooking space.

Whilst the chickens are cooking a theatre effect is obtained by lamps 88 which illuminate the chickens 81. Each lamp 88 comprises a fluorescent tube assembly comprising two gas filled tubes 142 and a starter device 143. Each lamp 88 is positioned behind a window 140 behind a respective panel 141. An important feature is that such a fluorescent lamp is positioned so as to issue light over an angular span Y and so evenly illuminate the cooking chickens (in rotisserie mode) directly at the position where the heated air hits the product and directly in the line-of-sight of potential customers. It is at this point where the heated air makes the chicken skin shimmer, thus giving maximum theatre effect (ie producing an enhanced appearance) to potential customers. A typical value of Y would be around 40° to 50°. It will be appreciated that a lamp assembly may, in an alternative embodiment only be provided at one end (ie the front or the back) of the oven.

The oven 40 can be operated in convection oven mode by removing the rotisserie arrangement and installing a racking framework 95, as best seen in FIGS. 10 and 11. The framework comprises six upright members 96 and vertically spaced horizontal rails 97 which are provided parallel to the side walls of the oven cavity. The rails 97 allow trays 98 to be slid and supported thereon.

The racking framework 95 is attached to the oven by way of two upper attachment assemblies each comprising two inclined struts 101 and a lateral strengthening component 102, and two lower attachment assemblies each comprising two inclined struts 103. The four upper inclined struts 101 are releasably secured to the ducting 41 by way of respective fasteners 105, and the four lower inclined struts 103 are releasably secured to plates 22 by way of fasteners 106.

As is evident from FIG. 10 the heated air outlets 46 have been pivoted outwardly by approximately 80° into a convection oven condition. Accordingly heat therefrom is directed towards the doors 4, 5 and down in to the oven cavity, and the air then flows generally across the cavity before rising towards the inlets to the fans 7 to be re-circulated.

Advantageously in both modes the atomiser is capable of metering atomised water droplets in the form of a mist into the oven cavity below the ducting 41 (as is shown in FIG. 6). The atomiser is controlled by a solenoid valve linked to a timer and so enabling the amount of water injected into the oven cavity to be regulated according to how long the solenoid valve is activated. The water droplets will for the most part, be drawn towards the fans 7 and forced across the heaters 8 and then issued through the heater air outlets in the form of steam. The atomiser 46 requires a water pressure of around 1 to 2 Bar and therefore no booster pump is required. The precise metering of water in to the oven cavity advantageously provides various levels of humidity and therefore much less liquid emanates from the food, and in particular meat, being cooked thus obviating the need for a fixed drainage system and a fat separation system.

In an alternative embodiment the atomiser 46 may be located so as to issue the atomised water droplets principally into the space (the air box space) between the ducting 41 and the roof 44. A further alternative would be to arrange that the atomised mist is issued both into the air box space and directly into the space below the ducting 41.

It may be that the atomiser is controllable continuously by way of a feedback signal from a humidity sensor.

The discs 50 are advantageously non-handed so that they can be mounted in the oven from either end (ie through either of the doors 4,5) in either orientation (ie when rotated about its diameter by 180°). This versatility results from the arrangement of the through-holes 52, 53 and 54 which allows any two of said through-holes to be used to receive spits regardless of the orientation in which the discs are installed.

It will be appreciated that in an alternative embodiment some or all of the through-holes 52, 53 and 54 may be replaced by blind bores or recesses formed in the outer surface(s) of the disc. For ease of manufacture it is preferred to form through-holes. In yet a further embodiment the discs may be provided with outwardly extending protrusions that are adapted to receive spits.

It will be appreciated that the discs 18 of FIGS. 1 and 2 could be provided with additional through-holes so as to provide the advantages of discs 50.

It is to be noted that it is very important that the chickens are loaded onto the rotisserie in the correct orientation (designated by angle β) with regard to the angle of incidence (designated by angle α) of the blades of heated air. A typical value for each of α and β would be approximately 60°.

In one highly preferred embodiment both the speed of the fans 7 and the voltage applied to the heaters 8 are controllable.

In an alternative embodiment the pivotable heated air outlets are mounted to be adjustable to be set to more than two indexed positions. It may be however that the heated air outlets are infinitely adjustable between two extreme positions. It is preferred that the pivotable heated air outlets have a maximum extent of angular movement of approximately 80° between extreme positions. It may be however that the extent of angular movement between extremes is approximately 120°.

In another embodiment one or both of the heated air outlets may be removable and repositioned or replaced (with a differently configured outlet) to achieve different cooking modes. In yet further embodiments adjustment of the direction at which heated air enters the cooking space may be achieved by a valving arrangement which is controllable by a user.

The invention claimed is:

1. An oven comprising a fan and a heater, the oven arranged to operate in a grill mode in which at least one blade of heated air is directed towards foodstuffs in the cooking space, and arranged to operate in a convection mode in which heated air is substantially evenly distributed in the cooking space;

the oven comprises an adjustable heated air outlet arranged to be adjustable to direct heated air into the cooking space according to a desired cooking mode;

the heated air outlet is adjustable to set the direction at which heated air enters the cooking space, and is capable of being set to effect the grill mode and the convection mode; and the adjustable heated air outlet comprises a pivotally mounted conduit arranged to be set at different angular positions to effect different cooking modes.

2. An oven as claimed in claim 1 in which in grill mode the at least one blade of heated air is directed generally inwardly of the cooking space.

3. An oven as claimed in claim 1 in which, in use, two blades of heated air are directed towards the food.

4. An oven as claimed in claim 1 in which in the grill mode heated air is directed into the heated oven cavity by way of grill ducting configured to produce the at least one blade of heated air and in the convection mode heated air is directed into the cooking space by way of convection ducting, which convection ducting is configured to introduce heated air into the cooking space such that said heated air is substantially evenly distributed in the cooking space.

5. An oven as claimed in claim 4 in which the grill ducting and the convection ducting are adapted to be detachably connected to the oven, and in use one or the other ducting is installed to effect a required cooking mode.

6. An oven as claimed in claim 1 in which the at least one blade of heated air is directed toward a center of the cooking space relative to a direction at which heated air enters the cooking space in the convection mode.

7. An oven as claimed in claim 1 which comprises two adjustable heated air outlets which are provided near the roof of the cooking space and adjacent to opposite oven side walls.

8. An oven as claimed in claim 1 in which the oven is adapted to be capable of being provided with shelving to support containers and is provided with means for detachably installing rotatable spit structure.

* * * * *